(12) United States Patent
Phillips et al.

(10) Patent No.: US 7,376,386 B2
(45) Date of Patent: May 20, 2008

(54) SYSTEMS AND METHODS FOR DISTRIBUTING CONTENT OBJECTS IN A TELECOMMUNICATION SYSTEM

(75) Inventors: Bruce A. Phillips, Erie, CO (US); Steven M. Casey, Littleton, CO (US)

(73) Assignee: Qwest Communications International Inc, Denver, CO (US)

( * ) Notice: Subject to any disclaimer, the term of this patent is extended or adjusted under 35 U.S.C. 154(b) by 680 days.

(21) Appl. No.: 10/452,996

(22) Filed: Jun. 2, 2003

(65) Prior Publication Data

US 2005/0022007 A1    Jan. 27, 2005

(51) Int. Cl.
*H04H 1/00* (2006.01)
*H04Q 7/20* (2006.01)
*H04Q 7/22* (2006.01)

(52) U.S. Cl. ............... 455/3.01; 455/422.1; 455/412.1; 379/142.01

(58) Field of Classification Search ............... 455/3.01, 455/3.05, 422.1; 713/201; 709/203, 316, 709/201; 370/352, 392; 379/88.01, 142.16, 379/142.01
See application file for complete search history.

(56) References Cited

U.S. PATENT DOCUMENTS

| | | | |
|---|---|---|---|
| 5,202,765 A | 4/1993 | Lineberry | |
| 5,635,980 A * | 6/1997 | Lin et al. | 725/131 |
| 5,740,075 A | 4/1998 | Bigham et al. | |
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,209,025 B1 | 3/2001 | Bellamy | |
| 6,282,189 B1 | 8/2001 | Eames | |
| 6,894,999 B1 * | 5/2005 | Acharya | 370/352 |
| 7,292,590 B1 * | 11/2007 | Chen et al. | 370/401 |
| 2001/0051980 A1 * | 12/2001 | Raciborski et al. | 709/203 |
| 2003/0026416 A1 | 2/2003 | Fusco | |

OTHER PUBLICATIONS

Frank, Edward and Holloway, Jack; "Connecting the Home with a Phone Line Network Chip Set", IEEE Micro, Mar.-Apr. 2000, pp. 2-14.

* cited by examiner

*Primary Examiner*—Tilahun Gesesse
(74) *Attorney, Agent, or Firm*—Townsend and Townsend and Crew LLP

(57) ABSTRACT

The present invention provides systems and methods for distributing content objects to a requester. Some of the systems include at least one content object origination, and two or more content object destinations. The two or more content object destinations are associated with customer premises. Communication links communicably couple the content object origination and at least one of the content object destinations, and at least two of the content object destinations. Local storage is associated with at least one of the content object destinations. A content object from the content object origination is maintained on a local storage associated with one of the content object destinations, and the content object is accessible via the local storage to another content object destination. The methods provide various ways for distributing content objects using systems similar to that previously described.

28 Claims, 13 Drawing Sheets

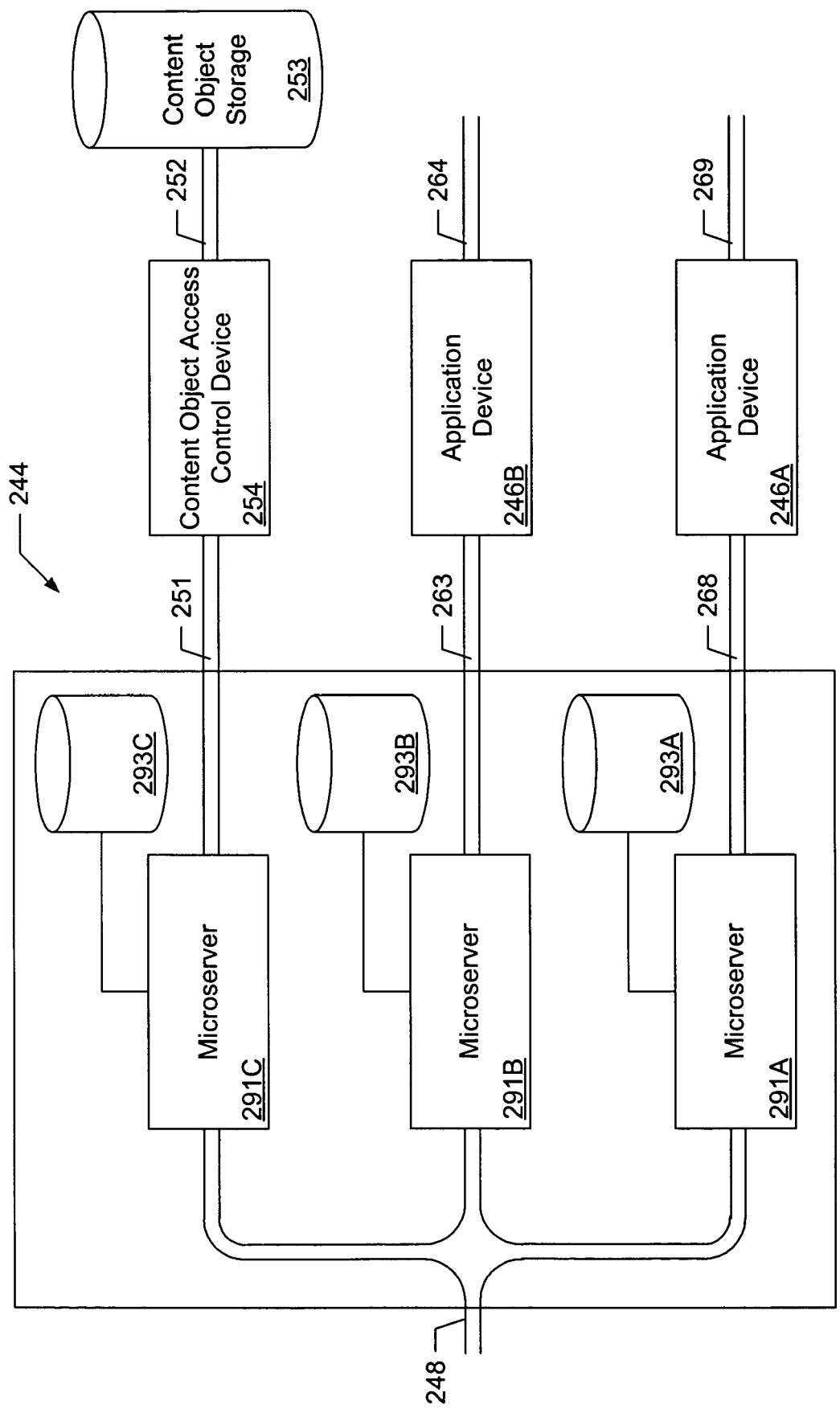

SYSTEMS AND METHODS FOR DISTRIBUTING CONTENT OBJECTS IN A TELECOMMUNICATION SYSTEM

CROSS-REFERENCES TO RELATED APPLICATIONS

The present invention is related to U.S. patent application Ser. No. 10/356364, entitled "PACKET NETWORK INTERFACE DEVICE AND SYSTEMS AND METHODS FOR ITS USE," filed Jan. 31, 2003 and assigned to an entity common herewith; U.S. patent application Ser. No. 10/356688, entitled "SYSTEMS, METHODS AND APPARATUS FOR PROVIDING A PLURALITY OF TELECOMMUNICATION SERVICES," filed Jan. 31, 2003 and assigned to an entity common herewith; U.S. patent application Ser. No. 10/356338, entitled "CONFIGURABLE NETWORK INTERFACE DEVICE AND SYSTEMS AND METHODS FOR ITS USE," filed Jan. 31, 2003 and assigned to an entity common herewith; U. S. patent application Ser. No. 10/367596, entitled "SYSTEMS AND METHODS FOR DELIVERING A DATA STREAM TO A VIDEO APPLIANCE," filed Feb. 14, 2003 and assigned to an entity common herewith; and U.S. patent application Ser. No. 10/367597 entitled "SYSTEMS AND METHODS FOR PROVIDING APPLICATION SERVICES," filed Feb. 14, 2003 and assigned to an entity common herewith. The entirety of each of the aforementioned applications is incorporated herein by reference for all purposes.

BACKGROUND OF THE INVENTION

The present invention is related to telecommunication systems. In particular, the present invention is related to systems and methods for distributing content using a telecommunication system or other related system.

Currently, content distribution services include receiving a request at a central location and distributing content associated with the request to the requester from the central location. Such an approach often results in a large number of requests being fielded by the central location. This can cause network congestion and/or failures. Some approaches created mirror sites that include copies of the information maintained at the central location. While this reduces congestion, it can require significant investment in storage. Further, transfers between mirror sites are pure overhead as an end user must still make a transfer from the mirror site.

Accordingly, there exists a need in the art to address the aforementioned problems, as well as other problems.

BRIEF SUMMARY OF THE INVENTION

The present invention provides systems and methods for distributing content objects to a requester. The content object can then be maintained and/or redistributed local to the requester. In some cases, the redistribution is over the same network used for a prior distribution, while in other cases, the redistribution utilizes a separate local network. In one particular case, the separate local network is a wireless network, such as, for example, a WiFi network.

Some embodiments of the present invention provide systems for distributing content objects. The systems include at least one content object origination, and two or more content object destinations. The two or more content object destinations are associated with customer premises. Communication links communicably couple the content object origination and at least one of the content object destinations, and at least two of the content object destinations. Local storage is associated with at least one of the content object destinations. A content object from the content object origination is maintained on a local storage associated with one of the content object destinations, and the content object is accessible via the local storage to another content object destination.

In some cases, a communication link communicably couples the content object origination to one of the content object destinations, while a subset of the communication link couples the content object destination to another content object destination. In a particular case, the communication link coupling the content object origination to one of the content object destinations shares a common physical layer portion with the communication link that communicably couples the content object destination to other content object destinations. In such cases, communications between the content object origination and the content object destination can be performed at a different frequency than the communications between content object destinations.

In some cases, the content object origination is a device operated at a customer premises. For example, the content object origination can be a video recorder and/or player, an audio recorder and/or player, a digital media storage element, and/or the like. In other cases, the content object origination is a central office server that can be maintained by, for example, a telecommunication service provider or a cable television provider.

A content object can be a number of different types of content. For example, a content object can be, but is not limited to, a digital video object, a digital audio object, a digital still picture object, a digital data object, a hybrid of the aforementioned, and/or the like. Further, the content objects can be live or pre-recorded.

In some cases, the customer premises include network interface devices that are physically coupled to the communication links between content object originations and/or content object destinations. In some such cases, a physical layer coupling the network interface device to the content object origination is physically coupled to a physically layer coupling the network interface device to another content object destination. In some cases, the physical layer coupling the network interface device to the content origination extends to various customer premises equipment. Such customer premises equipment can be, but is not limited to, a video recorder and/or player, an audio recorder and/or player, a digital media storage element, and/or the like. In other cases, the physical layer communicably coupling the network interface device to the content object origination includes a physical layer communicably coupling the network interface device to a central office server.

Some cases include a network interface device installed at a customer premises. The network interface device includes local storage and/or is capable of accessing local storage. In various cases, the network interface devices include a format converter. The format converter is capable of converting information in a first format to information in a second format. Thus, for example, information available on the local storage may be provided in one format, and provided in another format when accessed. The various formats can include, but are not limited to, MPEG2, MPEG4, text, digital audio, program data, Bitmap, JPEG, GIF, HTML, and XML.

Other embodiments of the present invention provide methods for distributing content objects. The methods include receiving a request for a content object. In accordance with the request, the content object is distributed to a customer premises where it can be maintained on a local storage associated with the customer premises. In addition, the content object is marked as accessible from the local storage. Another request is received for the content object, and the request is redirected to the local storage. This request is at least partially satisfied from the local storage.

In some cases, the request for the content object is received at a central office, and the redirection is provided via the central office. The central office can be communicably coupled to two or more customer premises by communication links. In other cases, the request for the content object is received at the customer premises where a device supporting the content object is located.

Further, in some cases, the local storage is associated with a network interface device installed at a customer's premises. In such cases, the method can further include providing network interface devices at customer premises, and the distribution of the content object from the first customer premises to the second customer premises is performed via the first network interface device and the second network interface device.

In various cases, the method further includes converting the content object from a first format to a second format prior to distributing the content object to the second customer premises. The first and second formats can be, but are not limited to MPEG2, MPEG4, text, digital audio, program data, Bitmap, JPEG, GIF, HTML, and XML.

Yet other embodiments of the present invention provide methods for distributing content objects that include generating a content object that is then maintained on a local storage associated with a customer premises. The content object is identified as a sharable content object. A request is received for the content object, and the content object is distributed to another customer premises based at least in part on the request for the content object and the identification of the content object as sharable.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
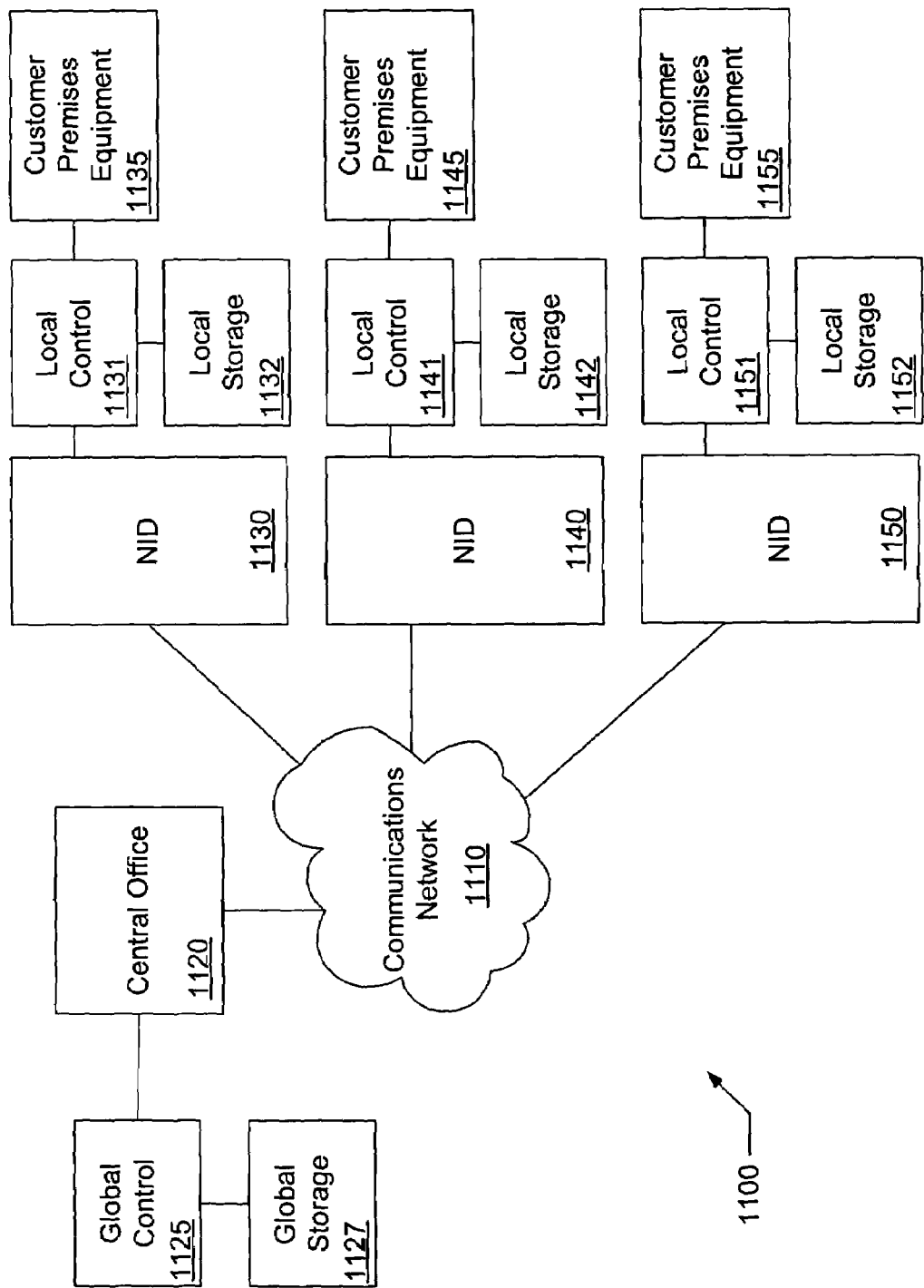
FIGS. 1 illustrate a system in accordance with some embodiments of the present invention.

The present invention provides systems and methods for distributing content objects to a requester. In some cases, the content object can be originated at a central office, but distributed from a point local to the requester. Alternately, the content object can be originated a customer premises coupled to a communication network, and distributed to another customer premises coupled to the communication network.

As used herein, a "content object" is broadly defined to include any group of information that can be accessed via a communication network. Thus, for example, a content object can be, but is not limited to: a pre-recorded digital video segment, a live digital video segment, a pre-recorded digital audio segment, a live digital audio segment, a data file, a voice mail message, a digital picture, and/or the like. A "content object origination" is also broadly defined to be a location where a content object is maintained. In some cases, this can be a primary location, such as a central office of a telecommunication service provider, a distribution point of a cable television provider, or the like. In other cases, a content object origination can be a secondary distribution point that has a copy of the content object located at a primary location. Further, a "content object destination" is a location were the content object is to be utilized. For example, the content object may be a video program, and the content object destination is a customer premises where the content object is to be watched. In particular instances of the invention, a content object destination can serve as a content object origination (and can be referred to as either a content object destination or content object origination) where content objects are either produced at the content object destination for distribution to other content object destinations, or maintained and accessible to other content object destinations.

In various cases, content objects can be distributed via a network interface device maintained at the customer premises. Such network interface devices can be broadly described as a "demarcation device," and specific examples of how the demarcation capabilities arise in different embodiments of the network interface systems are discussed below. Merely by way of illustration, such demarcation capabilities may derive from elements comprised by the following examples of demarcation devices: a set-top box, which may be used inter alia as an interface between a customer's video appliance and a provider's video network; broadband modems, including xDSL modems, cable modems, and wireless modems, each of which may be used to provide video and/or data to a customer premises; integrated access devices, which may, for example, translate between Voice over IP ("VoIP") signals and traditional telephone signals, allowing traditional telephones to connect to a VoIP network; devices compatible with the session initiation protocol ("SIP"); and the like. One particular demarcation device whose elements may be used to provide demarcation capabilities includes a network interface device ("NID"), described in detail below. In some instances, a demarcation device may additionally include other capabilities, including, for example, the capability to separate received telecommunication information into discrete sets; the capability to process certain of the separated sets independently from other sets; and/or the capability to transmit different of the separated sets to different locations, perhaps through the use of different interfaces.

In describing embodiments of the invention, references to "customer premises" are intended to refer to physical structures under the control of a customer through ownership, leasehold, or any other property right. The term is not intended to encompass open real property external to the physical structures, even if such open real property is also under the control of the customer. Such a definition reflects differences in accessibility to the physical structures and surrounding open real property. Access to the physical structures generally requires the presence of the customer or a representative of the customer, while access to the surrounding open real property may be obtained by permission from customer, through an easement, or by other means that does not require the physical presence of the customer. Thus, for example, in the case of a residential customer, the customer premises may correspond to the customer's home, but does not include the yard surrounding the home. Access to the yard may be obtained even when the customer is not home, such as when the customer is at work, is shopping, or is otherwise unavailable to be physically present.

In this application, the term "telecommunication service provider" refers to any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

In certain embodiments, demarcation capabilities can support the one-way flow of telecommunication information including content objects, such as exemplified by the case of a simple set top box, which can receive data representing a video signal, decode that data, and transmit a video signal to an attached television. In other embodiments, demarcation capabilities can support bidirectional flow of telecommunication information. One such example is an xDSL modem, which allows the transmission of data both to and from a customer premises. In still other embodiments, the demarcation capability can support both unidirectional and bidirectional information flows simultaneously, depending on the type of telecommunication information transmitted or the source of the information.

The demarcation capabilities may also function to isolate the telecommunication service provider's network from the network at the customer premises. As described in detail below, the service provider's network is one example of an "external transport medium" and the customer's network is one example of an "internal transport medium." The external transport medium and internal transport medium are each examples of a "transport medium," which is used herein to describe any cable, wire, or other medium capable of carrying telecommunication information, including, but not limited to, twisted pair copper wiring (shielded or unshielded, including, for example, unshielded cables complying with industry-standard categories 3, 5, 5e and 6), optical fiber, and coaxial cable. Other examples of transport media include universal serial bus ("USB") cable, cable complying with the Institute of Electrical and Electronics Engineers' ("IEEE") 1394 standard, as well as any medium capable of complying with the many local-area networking standards known in the art. The preceding are examples of transport media that comprise physical media, but the invention is not limited to the use of physical media. In other embodiments, a transport medium may comprise any of a wide variety of wireless transmissions, including infra-red transmissions, radio frequency ("RF") transmissions, and transmissions complying with standards developed by any of the IEEE's working groups governing wireless communication (e.g., the 802.11, 802.15, 802.16 and 802.20 working groups), as well as point-to-point microwave, satellite, cellular/PCS, and/or ultra wideband transmissions, among others.

As will be appreciated, a transport medium can include a physical layer upon which signals are passed. In some cases, signals of different frequencies are passed on the same physical layer. Thus, for example, transmitting a content object from a content object origination to a content object destination may be done at a first frequency, or spectrum, and transmitting a content object between content object destinations can be done at a different frequency, or spectrum.

In certain embodiments, demarcation capabilities can define an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media, and/or other operational parameters of a network. This isolation feature can provide many benefits; for instance, the demarcation capability can be realized by a disclosed interface between a customer premises and a provider's network, allowing the provider to implement changes in its network without disrupting the service provided to the customer.

Likewise, the isolation of the internal transport medium from the external transport medium can allow for any variety of customer premises equipment ("CPE") to be used at the customer premises without fear that the equipment might be incompatible with a particular telecommunication service provider's standards. "Customer premises equipment" and "CPE" are intended to refer to any device that sends, receives, or otherwise utilizes content objects. Moreover, the demarcation capabilities might serve to couple a plurality of external and/or internal transport media, allowing interoperation among them all, and to provide the same isolation features among all of these media.

Referring to FIG. 1A, a system 1100 in accordance with some embodiments of the present invention for distributing content objects is illustrated. System 1100 includes a central office 1120 that can be coupled to a global control 1125, a global storage 1127, and a communication network 1110. A number of NIDs 1130, 1140, 1150 are also coupled to communication network 1110. These NIDs can be installed at customer premises where various CPE 1135, 1145, 1155 is maintained. Each of the NIDs 1130, 1140, 1150 include a local control 1131, 1141, 1151, and a local storage 1132, 1142, 1152, respectively. As will be appreciated from the disclosure provided herein, a NID or demarcation device is not necessary to practice some embodiments of the present invention. Rather, any device satisfying the requirements of a content object destination with local storage can be used.

Central office 1120 can be any central distribution point for content objects. Thus, for example, central office 1120 can be a home office or local office of a telecommunication service provider. Alternatively, central office 1120 can be a cable television provider. In most cases, central office 1120 is a content object origination as it is rare for content objects to be utilized at the central office, but rather, the content objects are typically only distributed from the central office. Based on the disclosure provided herein, one of ordinary skill in the art will appreciate a number of different types of central offices.

Global control 1125 can be an application operated in relation to central office 1120 that provides access to and/or control of various content objects maintained on global storage 1127. Thus, for example, where central office 1120 is associated with a cable television provider, and the content objects are on-demand video programs, global control 1125 can be responsible for identifying a requestor and/or authenticating the requester, accessing a selected video program from global storage 1127, and/or providing the selected video program to the requestor. In some cases, the content objects maintained on global storage are created at central office 1127, while in other cases the content objects are created elsewhere and only maintained on global storage 1127.

NIDs 1130, 1140, 1150 are further described below in relation to FIGS. 4 and 5. In some cases, such NIDs provide a convenient network access point for a customer premises. As such, the NIDs can accept information from the network for the customer premises and/or provide access to information originated at the customer premises to other requesters on the network.

Local controls 1131, 1141, 1151 can be an application operated in relation to NIDs 1130, 1140, 1150, respectively. In particular, local controls 1131, 1141, 1151 can provide access to and/or control of various content objects maintained on respective local storages 1132, 1142, 1152. Local storages 1132, 1142, 1152 can be a hard disk drive or other type of storage element, or combination of storage elements. Based on the disclosure provided herein, one of ordinary skill in the art will recognize a number of other storage elements and/or storage systems that can be used in relation to the present invention. CPE 1135, 1145, 1155 can access content objects from respective local storages 1131, 1141, 1142. Alternatively, or in addition, CPE 1135, 1145, 1155 can create content that can be maintained on respective local storages 1132, 1142, 1152, or provided live across communication network 1110 via respective NIDs 1130, 1140, 1150.

Figure 1B:
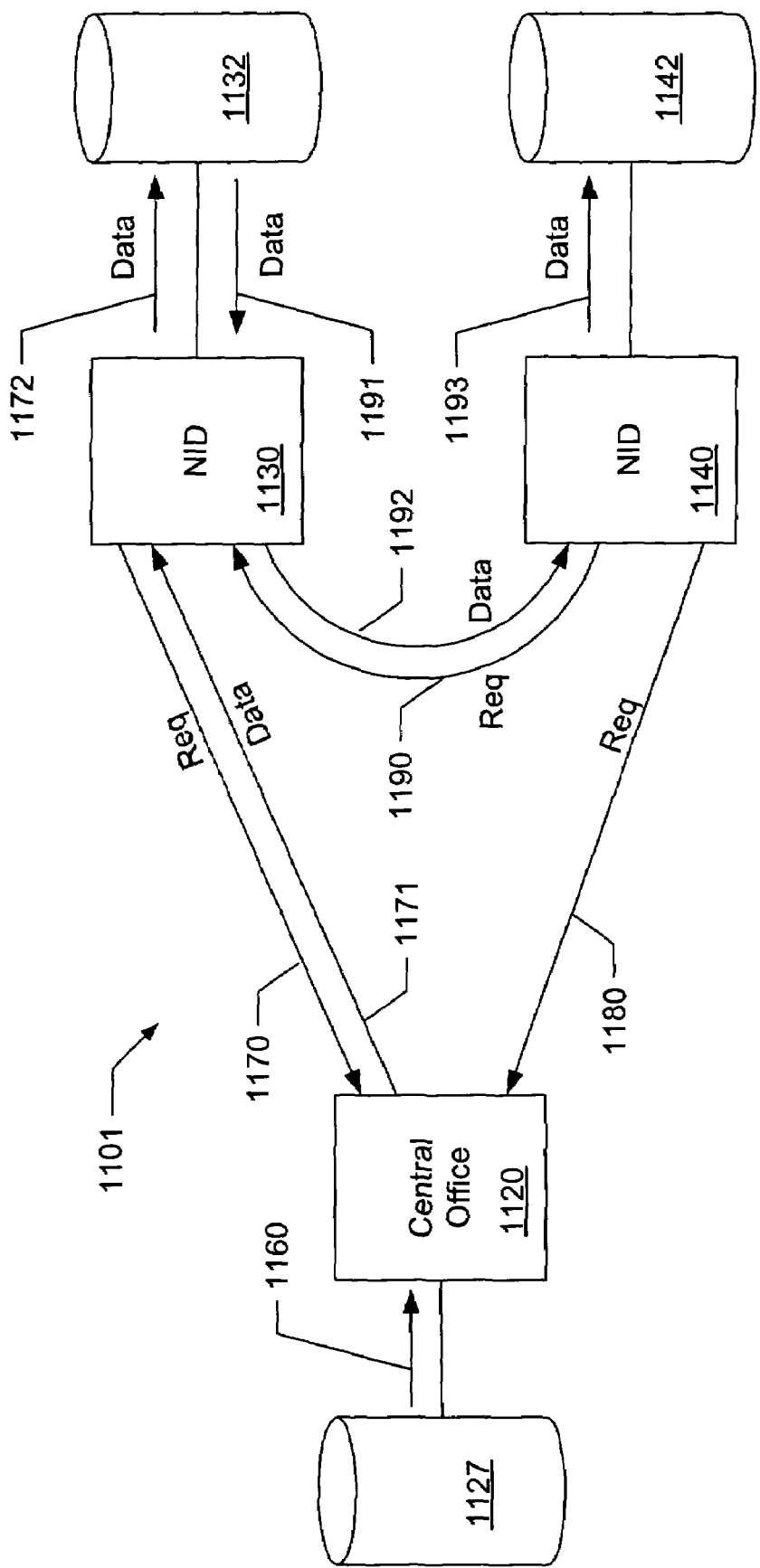

Turning to FIG. 1B, a data flow diagram 1101 depicts the flow of content objects and requests associated therewith in the previously described system 1100. Initially, a request 1170 for a content object is sent via NID 1130 to central office 1120. The request is processed by global control 1125, and a content object identified in the request is accessed as data 1160 from global storage 1127. The content object is then transferred as data 1171 from central office 1120 to NID 1130 where it is transferred as data 1172 to local storage 1132. The content object can then be used at the customer premises associated with NID 1130.

In addition, the content object can be maintained on local storage 1132 where it can be later accessed by other users. Thus, for example, where another request 1180 for the same content object is issued via NID 1140 to central office 1120, the request can be redirected to NID 1130 where the content object is maintained. A subsequent request 1190 can be issued from NID 1140 to NID 1130 for the content object, and in turn, the content object can be accessed from local storage 1132 as data 1191, transferred to NID 1140 as data 1192, and stored on local storage 1142 as data 1193. From here, the content object can be accessed and used at the customer premises associated with NID 1140.

Access to the content object via NID 1140 is in part controlled by local control 1131. Local control 1131 can authenticate NID 1140, and/or a user issuing the request, and determine whether to serve the content object to NID 1140. Further, in some cases, local control 1131 can provide a billing function wherein a portion of an access cost is distributed to a customer maintaining local storage 1131.

Figure 2:
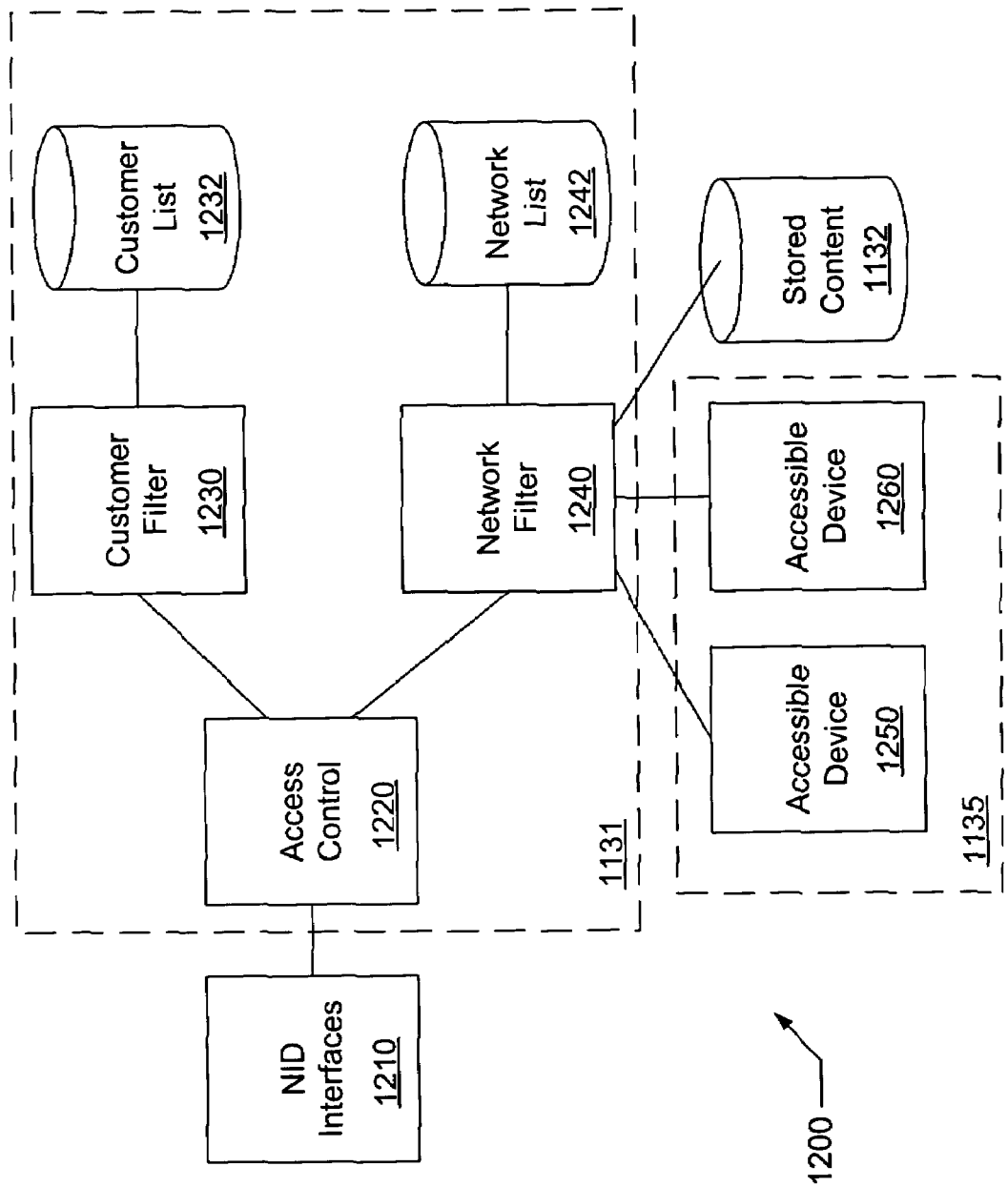
FIG. 2 depicts a detailed portion of the system of FIGS. 1.

FIG. 2 illustrates a portion 1200 of system 1100. More specifically, portion 1200 includes detail of local control 1131, local storage 1132, CPE 1135, and an interface 1210 to NID 1130. Interface 1210 includes circuitry and/or software used to communicate information between local control 1131 and NID 1130. Local control 1131 includes an access control 1220 that is responsible for determining whether CPE 1135 and/or stored content 1132 is publicly available, limited to a group, or limited to private use only. To do this, access control 1220 utilizes a customer filter 1230 and a network filter 1240. Customer filter 1230 reviews content object headers defined by the users that designate various access levels of content objects. Form this header information, a customer list 1232 is assembled identifying the various content objects and associated access levels. Similarly, network filter 1240 can access content object headers assembled by third party distributors of content objects to assemble a network list 1242 identifying the various content objects and accessibility associated therewith. Based on the disclosure provided herein, one of ordinary skill in the art will appreciate a number of other levels of protection that can be assigned to various content objects.

In operation, when a user tries to view a list of content objects available from CPE 1135 and/or content storage 1132, access control 1220 determines the identity of the requestor. This can be done by, for example, receiving a user name and password from the requester, or by other means known by those of ordinary skill in the art. Using this identification information, access control 1220 queries network filter 1240 and customer filter 1230 to determine which content objects defined in customer list 1232 and network list 1242 accessible by the requester. From this, a combined list of content objects available to the requester is presented to the requestor.

Figure 3:
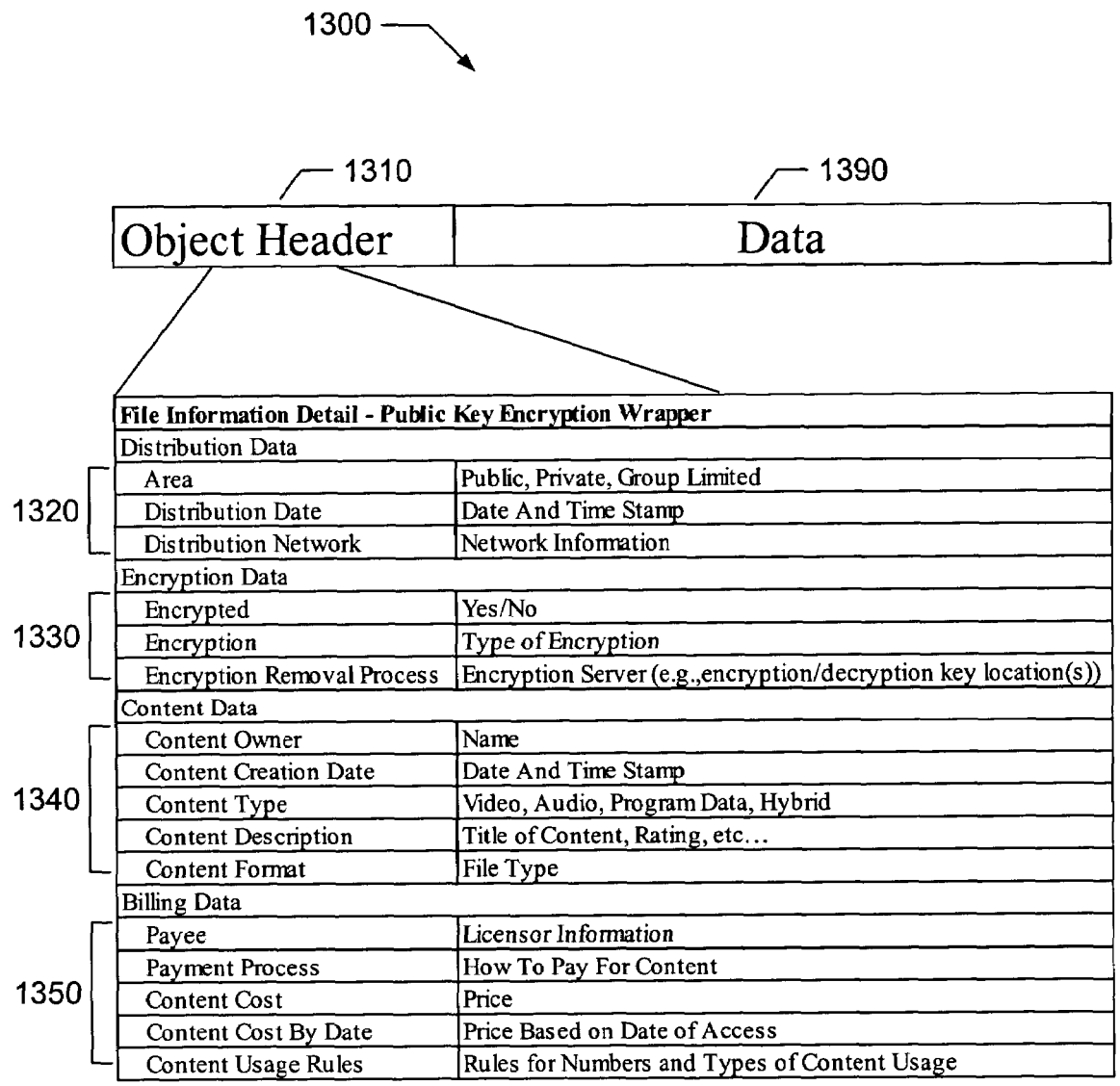
FIG. 3 illustrates a data structure useful in relation to some embodiments of the present invention.

As previously suggested, access control 1220 can utilize a content object header associated with each content object in combination with either or both of customer list 1232 and network list 1242 to determine, among other things, distribution availability. One such content object 1300 including a content object header 1310 and a content object data 1390 is depicted in FIG. 3. As illustrated, content object header 1310 can have a number of different fields including, but not limited to, a distribution data field 1320, an encryption data field 1330, a content data field 1340, and a billing data field 1350.

Distribution data field 1320 can include a designation of whether the content object is public, limited to group use, or limited to personal use. In addition, it can include a time stamp for when the content object was written to local storage, as well as information from the network from which it was received. Encryption data field 1330 can include an indication about whether the data is encrypted, the type of encryption used, and an address for an encryption server capable of providing encryption keys. Content data field 1340 includes an indication of the content object owner, the date on which the content object was created, the type of content included in the content object, a description of the content included as part of the content object, and the file format of the content object. Further, billing data 1350 can include information useful in re-distributing the content objects. This can include information about the recipient of any payments, rules for how to pay for content, cost of the content, variable cost based on when the content is accessed, and rules associated with content usage. All of this information can be used in relation to distribution decisions performed by access control.

In operation, customer filter 1230 and/or network filter 1240 can use content object headers 1310 associated with the various content objects to assign the associated content object to the proper customer list and/or network list with associated availability information. As previously noted, some of the content objects are live streams available from accessible devices 1250, 1260. Such accessible device can be any number of device types including, but not limited to, video cameras, video playback devices, audio players, and/or the like.

As will be appreciated from the preceding discussion, using systems and methods in accordance with the present invention, content objects can be distributed by a third party to a customer destination, and subsequently distributed from the customer destination to other customer destinations. Further, content objects can be created at a customer destination, and distributed to other customer destinations. Thus, in one sense of the invention, the systems and methods provide for establishing a content object destination, or a content object caching device, at a customer premises. Via these systems and methods, content objects can be distributed around a communication network. Further, content objects can be distributed within a customer premises. Yet further, a third party content object provider can preposition content objects at customer locations based upon usage. By providing this option, a network can be utilized more efficiently by off loading the centralized distribution points and store data in a distributed fashion. Then, as users request data their requests can be sent to content object originations and/or destinations in the network which have the requested content objects, and copies of the requested content objects will be made from one customer premises to the next. If the content objects are not more readily had from a content object destination than to a central content object origination, then the content object is distributed from the central content object origination. Where the same physical layer is used to transmit from the central content object origination as from another content object destination, it may be that geographic proximity is significant to the proper transmission. Thus, a content object may be more readily distributed from a local content object destination.

Once the copy is at the customer's premises, the customer's premises is registered by the central office as a new distribution point for this content. Once the content is deleted from the customer premises, then the customer is premises is removed as a distribution. Such an approach can be used to remove congestion from a network during peak periods.

While the previous discussion describes the systems in relation to NIDs, it is possible that a content object destination, or content object caching device, can be developed separate from any NID. This content object caching device can communicate with other content object caching devices in a peer-to-peer fashion. As previously suggested, content objects can be of a number of types including, but not limited to, video, software games, music, emails, user preferences, recorded voicemails, and/or the like. Such content objects can be distributed using systems and methods of the present invention in such a way that distribution rules are applied at various levels of the distribution. Thus, for example, voicemails could be defined to be shared only in the customer premises, and therefore anyone outside the customer premises would not have access. In addition, authentication system can be used to provide for content object access from anywhere upon proper authentication.

Further, the content object destinations can include Internet interfaces making content accessible from the devices in a user friendly fashion. The interface could provide a graphical interface for listing the available content as well as configuring the content object destination.

Some embodiments of the present invention provide content object destinations that include the following functionality: content object logging including historical logging; user/system authentication; accessible configuration; implementation of content object distribution rules; content object retention rules including, for example, first-in first out retention; content object distribution range rules including, but not limited to, geographical limits and/or logical limits (e.g., IP Address Range, MAC Address, Defined User Groups, etc.)

Figure 4:
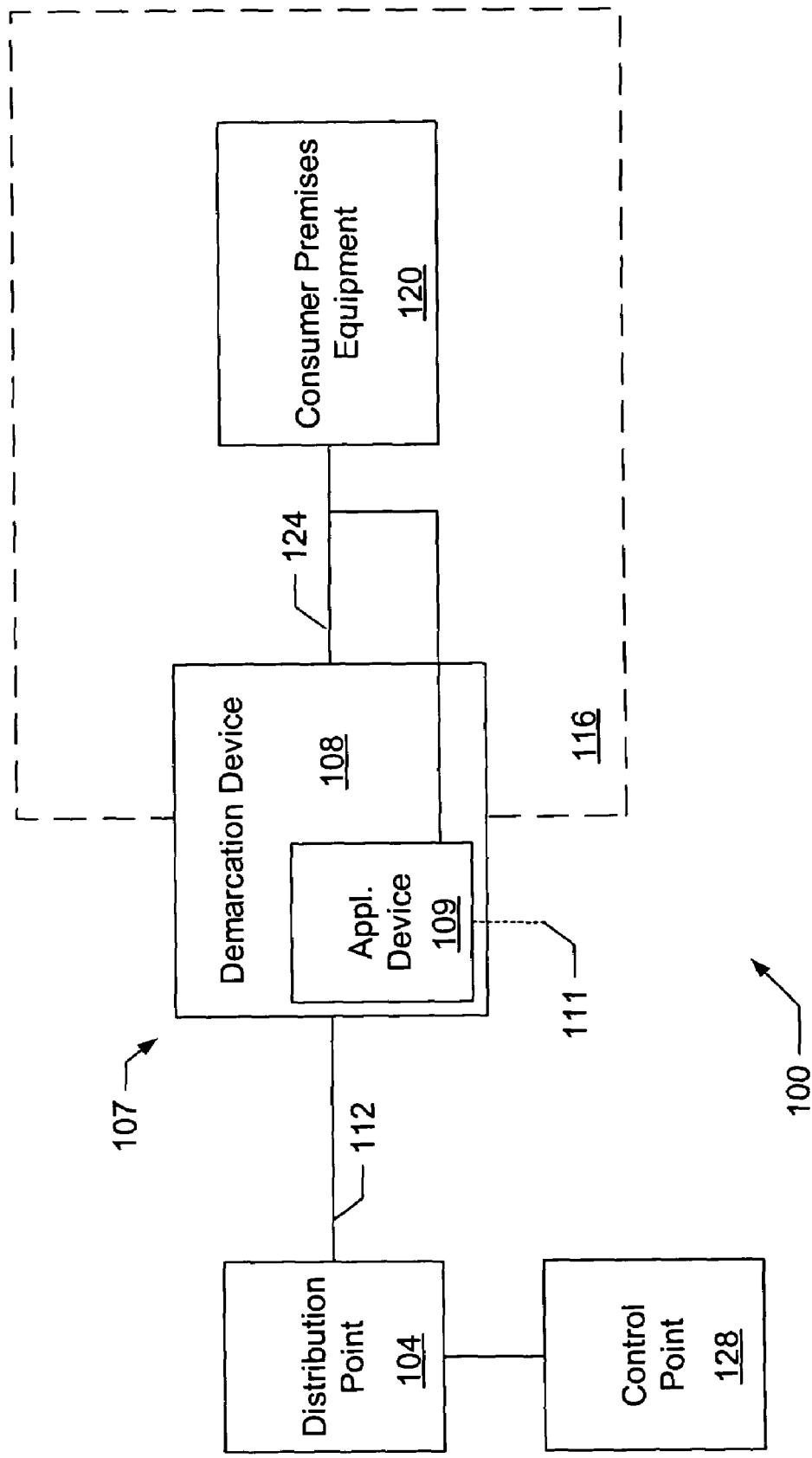
FIGS. 4 and 5 illustrate various demarcation devices and systems associated therewith that can be used in relation to embodiments of the present invention.

Turning to FIG. 4, one example of a system incorporating a demarcation device and/or network interface device ("NID") is described. FIG. 4 and the discussion associated therewith are adapted from the following U.S. Patent Applications that were previously incorporated herein by reference for all purposes: U.S. patent application Ser. No. 10/356364, entitled "PACKET NETWORK INTERFACE DEVICE AND SYSTEMS AND METHODS FOR ITS USE," filed Jan. 31, 2003 and assigned to an entity common herewith; U.S. patent application Ser. No. 10/356688, entitled "SYSTEMS, METHODS AND APPARATUS FOR PROVIDING A PLURALITY OF TELECOMMUNICATION SERVICES," filed Jan. 31, 2003 and assigned to an entity common herewith; U.S. patent application Ser. No. 10/356338, entitled "CONFIGURABLE NETWORK INTERFACE DEVICE AND SYSTEMS AND METHODS FOR ITS USE," filed Jan. 31, 2003 and assigned to an entity common herewith; U.S. patent application Ser. No. 10/367596, entitled "SYSTEMS AND METHODS FOR DELIVERING A DATA STREAM TO A VIDEO APPLIANCE," filed Feb. 14, 2003 and assigned to an entity common herewith; and U.S. patent application Ser. No. 10/367597 entitled "SYSTEMS AND METHODS FOR PROVIDING APPLICATION SERVICES," filed Feb. 14, 2003 and assigned to an entity common herewith.

A relatively simple configuration 100 for providing telecommunication services is depicted. Configuration 100 includes a distribution point 104 that can act as a content object origination in communication with a device 108 having demarcation capabilities via an external transport medium 112. In this example, external transport medium 112 comprises a transport medium external to a customer premises 116. Device 108 is shown in FIG. 4 as including an application device 109, which is adapted to interface with an internal transport medium 124. In this example, internal transport medium 124 comprises a transport medium internal to customer premises 116. While application device 109 is shown as part of demarcation device 108, this is not a requirement. In other instances, application device 109 may be distinct from, but coupled with, demarcation device 108, such as by using a modular design with plug-and-play technology.

In one sense, distribution point 104 may be considered to be a content object origination, a source of telecommunication information transmitted to the customer premises, and/or a recipient of content objects or telecommunication information transmitted from the customer premises, however, distribution point 104 need not be either the ultimate source nor the ultimate recipient of telecommunication information and/or content objects. In certain embodiments, distribution point 104 may correspond to a telecommunication service provider's local office. In other embodiments, distribution point 104 may correspond to another network element in the service provider's network, such as a remote termination cabinet and/or a digital subscriber line access multiplier ("DSLAM"). More generally, distribution point 104 may correspond to any facility operated by a telecommunication service provider that is capable of transmitting telecommunication information to, and/or receiving telecommunication information from, a customer premises 116.

Distribution point 104 can be capable of transmitting and/or receiving any type of telecommunication information to/from ANID 107, and such telecommunication information can be organized into a plurality of content objects, as necessary. For ease of description, FIG. 4A does not show any additional sources or recipients of telecommunication information in communication with distribution point 104, but, those skilled in the art will recognize that, in many embodiments, distribution point 104 can be coupled to multiple customer premises 116 (perhaps via an ANID 107 at each customer premises) and often is neither the ultimate source nor the ultimate recipient of telecommunication information. Instead, distribution point 104 can serve as an intermediary between one or more customer premises 116 and one or more telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises 116 and any source and/or recipient of telecommunication information that has a connection to the Internet. The interconnection of telecommunication networks is well known in the art, although it is specifically noted that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment, as described in the applications referenced above. In other embodiments, distribution point 104 can be in communication with one or more other customer locations, allowing for private virtual circuits, VLAN tags and wavelengths, or RF connections between customer premises 116 and those locations.

In configuration 100, ANID 107 can serve as the interface between external transport medium 112 and customer premises 116. As shown in FIG. 4, usually both demarcation device 108 and the 109 comprised by ANID 107 are interfaced with the internal transport medium 124, with the demarcation device interfaced with the external transport medium 112, although other interfacing configurations are also within the scope of the invention. For example, application device 109 may additionally be interfaced with the external transport medium 112. The application device may also include a service interface 111 for addressing the application device 109. The service interface 111 may comprise a physical interface, such as a universal serial bus ("USB"), FireWire (IEEE 1394), registered jack 11 ("RJ-11"), registered jack 13 ("RJ-13"), registered-jack 45 ("RJ-45"), serial, coax, or other physical interface known to those of skill in the art. In other embodiments, the service interface 111 may comprise a logical interface, such as may be provided through a logical connection with an IP address.

As conceptually illustrated in FIG. 4, demarcation device 108 and/or application device 109 may be attached to an external wall of the customer premises 116. Such attachment may be performed of an integrated ANID 107 or may be performed with the components separately of a separated ANID 107. Such a configuration provides many advantages. For instance, if the telecommunication service provider desires to upgrade or otherwise change its network, including, perhaps, external transport medium 112, a technician can perform any necessary changes at demarcation device 108 and/or application device 109 as appropriate without entering the customer premises. Coupled with the ability of some demarcation devices 108 to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises 116. Of course, demarcation device 108 and/or application device 109 may be located at a variety of alternative locations, either within customer premises 116 or at a facility operated by the telecommunication service provider. In addition, as previously noted and as discussed in further detail below, an ANID 107 may also be divided, with different portions situated at different locations, according to the requirements of the implementation.

Application device 109 is configured so that it may communicate with CPE 120, which may be located interior to the customer premises through internal transport medium 124. Such communication is used to implement applications defined by application device 109 with CPE 120 in accordance with telecommunication information received from distribution point 104. In addition, demarcation device 108 may communicate directly with CPE 120 to implement other functions. While the internal transport medium 124 may comprise any of the media discussed above, in one embodiment it comprises existing telephone wiring in customer premises 116 and, in some embodiments, is capable of carrying voice, data and video information. For instance, as described in Edward H. Frank and Jack Holloway, "Connecting the Home with a Phone Line Network Chip Set," *IEEE Micro* (IEEE, March-April 2000), which is incorporated herein by reference, the Home Phoneline Networking Alliance ("HPNA") standards allow for simultaneous transmission of both voice information and Ethernet frames across twisted-pair copper telephone wiring. In addition to the transmission of telecommunication information through ANID 107, either directly from demarcation device 108 or through the application device 109, telecommunication information may be transmitted via the reverse path to the distribution point 104. Such telecommunication information received at distribution point 104 may be transmitted to an information recipient, such as a service provider. For example, such a transmission may be used to request a pay-per-view movie or the like. Alternatively, telecommunication information received at distribution point 104 may be transmitted across the Internet, such as may be used in the case of sending an email message.

In certain embodiments, ANID 107 can receive state information from a control point 128, which is shown in the illustrated embodiment as associated with distribution point 104. In certain instances, control point 128 can be software and/or hardware operated by a telecommunication service provider for controlling certain features of the operation of ANID 107. For instance, control point 128 can instruct ANID 107 to provide (or cease to provide) particular applications and/or telecommunication services with application device 109 to the customer premises 116. Control point 128 can also provide other directions to ANID 107 through the demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand.

Often, it may be beneficial to allow the customer to provide state information to ANID 107. Thus, in certain embodiments, control point 128 may have a web interface, such that the customer or any authorized person, such as an employee of the telecommunication service provider or telecommunication information provider, may log onto the web interface and configure options for ANID 107, perhaps resulting in state commands being transmitted from distribution point 104 to ANID 107. In other embodiments, control point 128 can be a web interface to ANID 107 itself, allowing the customer or other authorized person to configure ANID 107 directly. In still other embodiments, control point 128 can communicate with ANID 107 through an application programming interface ("API"). Hence, in some embodiments, control point 128 can interface with ANID 107 through an API.

In many such embodiments, the API corresponds to the service interface 111 of the application device. In embodiments where the service interface 111 comprises a logical interface, the API can include a set of software, hardware, or firmware routines or libraries that may be invoked programmatically to configure or relay information to the application device 109. In that sense, then, control point 128 can be understood to be a program running on a computer, perhaps located at distribution point 104 or customer premises 116, among other locations, that provides state information to application device 109 via a software API.

In other embodiments where the service interface 111 comprises a physical interface such as those described above, the API may be accessed locally, such as by a service technician. For example, the service technician could visit property outside the customer premises 116, attach a laptop computer or other device to the physical service interface 111, and upload information to the application device 109, including perhaps both state information, as well as other telecommunication information. In still other embodiments, application device 109 can accept state information through other means, including, for example, through a web interface by receiving a specially formatted electronic message. This is especially the case in embodiments where application device 109 is capable of acting as a web server, as discussed below.

The addressability of application device 109 may be used in various embodiments to change the state of the application device 109. Such state information can include any set of data or other information that may be interpreted by application device 109 as defining operational instructions. This includes, for example, commands to process certain information sets in certain ways, e.g., to provide protocol conversion, to allow transmission of the information set, to deny transmission of the information set, to direct transmission on a particular interface, and the like, as well as commands to provide or cease providing a particular service, such as to provide access to a pay-per-view movie or an additional telephone line. Thus, in certain aspects, a telecommunication service provider can control the application services provided to a customer in several ways. First, the provider can only transmit a telecommunication information set to an ANID 107 if the user of that device is authorized to receive the application service associated with that information set. Alternatively, the service provider could send one or more application services to a customer's ANID 107, and rely on the state of the component application device 109 to prevent unauthorized access to those services.

Those skilled in the art will appreciate that certain control methods are better suited to certain services than to others. For instance, with respect to cable television services, the same set of information may be broadcast to many households, and ANID 107 is well-suited to control access to those services, allowing for greater efficiency in the providing of such services. In contrast, video on demand services may instead be controlled at a distribution point 104 or elsewhere such that a particular ANID 107 only receives video-on-demand information if the customer already has requested and been authorized to receive that service. In such cases, ANID 107 may not need to provide access control functions with respect to that service.

According to some embodiments, ANID 107 can implement either of these access control schemes, or both in combination, as well as others. Moreover, ANID 107 can, in some cases, be configured to support a plurality of schemes transparently. For instance, the customer could request a service from ANID 107, perhaps using one of the methods discussed above, and ANID 107 could relay that request to the appropriate telecommunication service provider and/or telecommunication information provider, as well as reconfigure itself to allow access to that service, if necessary. Of course, ANID 107 can also be configured to take any necessary validating or authenticating action, such as notifying distribution point 104 and/or control point 128 that the service has been requested, and, optionally, receiving a return confirmation that the service has been authorized.

In accordance with other embodiments, state information sent to ANID 107 can include one or more commands to interface with a particular CPE in a certain way. For instance, state information could instruct ANID 107 to turn on and/or off certain lights or equipment, perhaps via additional equipment, or to arm, disarm or otherwise monitor and/or configure a home security system. State information can also include operational data such as an IP address, routing information, and the like, to name but a few examples.

State information can further include instructions to modify one or more security settings of ANID 107. Merely by way of example, in certain embodiments, ANID 107 can include a computer virus scanner, and state information can include updated virus definitions and/or heuristics. Likewise, ANID 107 often will be configured with access controls, such as to prevent unauthorized access through ANID 107 by third parties. State information can include instructions on how to deal with particular third-party attempts to access ANID 107 or internal transport medium 124. Those skilled in the art will recognize as well that some security settings may specify the level of access the customer has to the functions of ANID 107, such as to prevent unauthorized use of certain telecommunication services, and that these settings also may be modified by received state information.

There are a variety of ways in which the various access-control and security functionalities of ANID 107 discussed above may be implemented. In different embodiments, these functionalities may be performed by the demarcation device 108, by the application device 109, by a combination of the demarcation and application devices 108 and 109, and/or by still other components that may additionally be comprised by ANID 107. Moreover, the state information that manages such functionalities may sometimes be sent periodically to ANID 107 to ensure that it is current. Those skilled in the art will also recognize that state information can be considered a subset of the broader category of telecommunication information.

Based on this disclosure, one of ordinary skill in the art will appreciate that a number of demarcation devices, NIDs, and/or encompassing systems can be used to implement the systems and methods in accordance with the present invention. For example, U.S. patent application Ser. No. 10/367597 entitled "SYSTEMS AND METHODS FOR PROVIDING APPLICATION SERVICES," describes a number of other examples that could also be used in accordance with the present invention. The aforementioned patent application was previously incorporated by reference for all purposes.

Figure 5A:
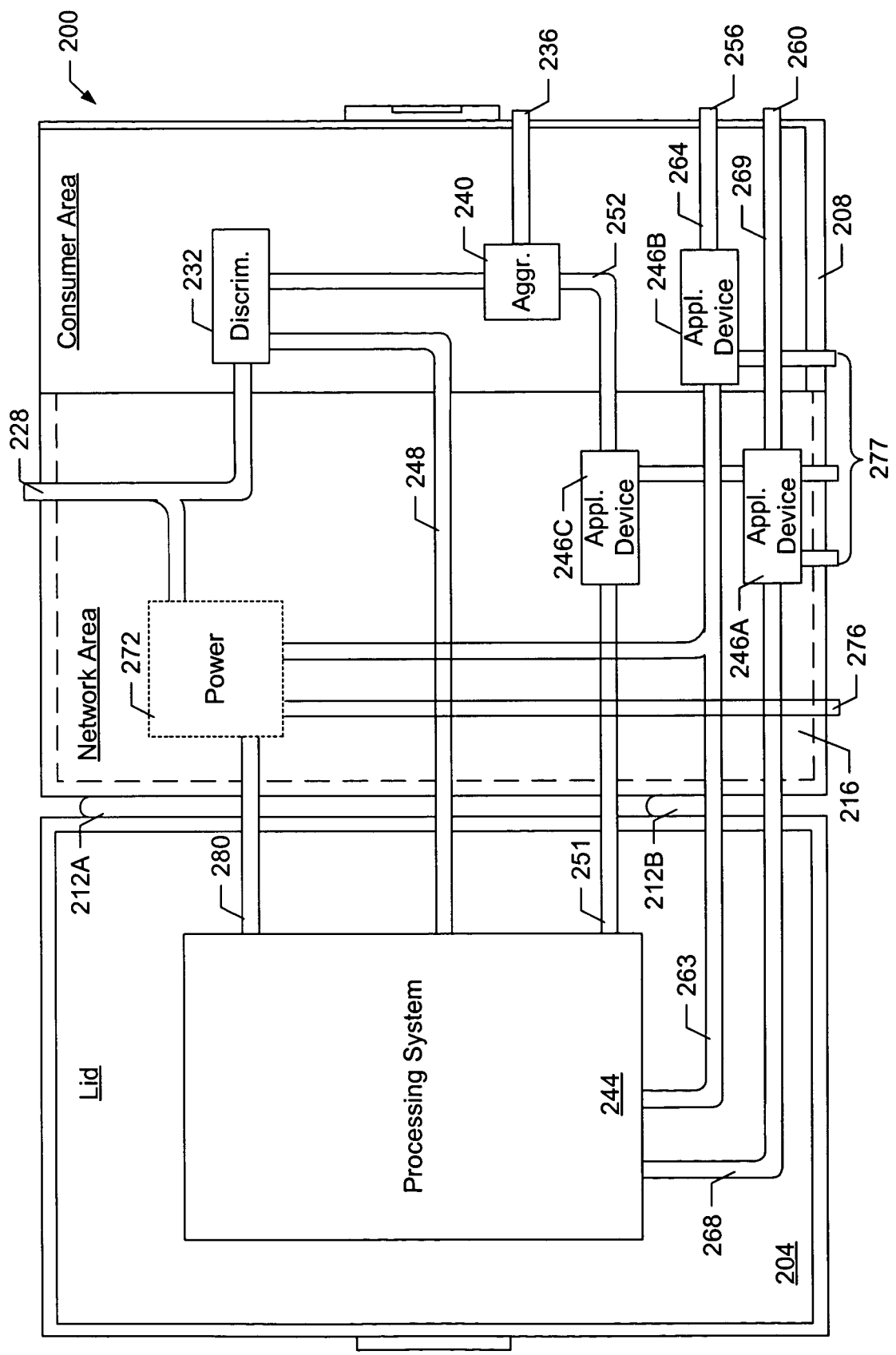
Figure 5B:
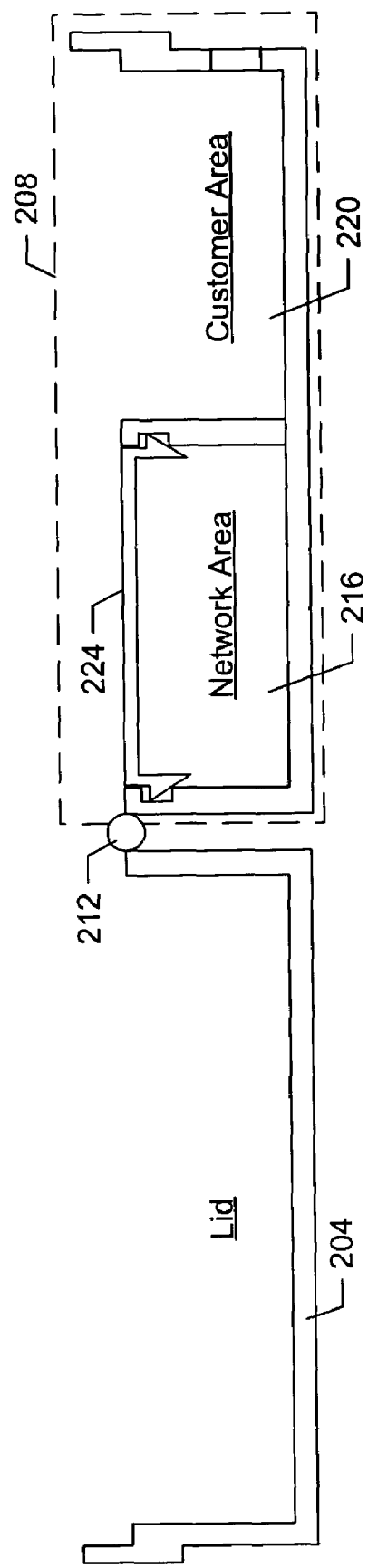

The aforementioned patent application additionally provides disclosure regarding mechanical and electrical characteristics of NIDs useful in relation to the present invention. In relation to FIGS. 5A-5C, a discussion adapted from the aforementioned application is provided. In contrast, FIG. 5D depicts another embodiment of a NID in accordance with some embodiments of the present invention. Turning to FIGS. 5A and 5B, one example of a NID 200 is illustrated. For purposes of illustration, FIG. 5A provides a top view that explicitly shows components within NID 200, while FIG. 5B provides a side view that shows the logical organization of NID 200 without the components. In the illustrated embodiment, NID 200 comprises a clamshell design, with a lid portion 204 and a body portion 208 connected by hinges 212A and 212B. Body portion 208 comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, NID 200 serves to isolate the telecommunication service provider's network from the customer's network, as described above.

NID 200 can include a first interface 228 for communicating with the provider's external transport medium. Those skilled in the art will recognize that, in some embodiments, as described above, the external transport medium may comprise the twisted-pair copper "local loop" running from the customer's premises to the telecommunication service provider's local office, and interface 228 will allow for the attachment of the local loop to NID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which NID 200 could include multiple interfaces. In some such embodiments, NID 200 can function to couple a plurality of external transport media to one another, seamlessly increasing the bandwidth available to the customer premises. For instance, a customer premises might have a satellite link to one telecommunication service provider and an ADSL link to another provider, and NID 200 could combine or multiplex these two links to provide an apparent single, higher-bandwidth to the customer premises. Similarly, those skilled in the art will recognize that in certain of these embodiments, a particular external transport medium, such as a satellite link, may be more well-suited to one way transmission of telecommunication information; in such cases, NID 200 could use a second external transport medium, such as an ADSL link, to allow transmission in the other direction.

Interface 228 can be coupled to a discrimination device 232, which can be operative to separate information sets received on interface 228, and, conversely, aggregate information sets for transmission on interface 22. Merely by way of example, in particular embodiments, discrimination device 232 can separate POTS information from other telecommunication information and/or isolate signals on the internal transport medium from the external transport medium and vice versa. In some embodiments, for instance xDSL implementations, discrimination device 232 can comprise one or more filters. Such filters can include, but are not limited to, high-pass, low-pass, and/or band-pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Discrimination device 232 can be operable to separate information sets through a variety of criteria, including for example, by frequency, by destination device, information type, and/or frequency. Further, in certain embodiments, information sets can be multiplexed (for instance, using various time-division multiplexing or wave-division multiplexing schemes known in the art) for transmission over an external transport medium, and discrimination device 232 can comprise a demultiplexer capable of separating multiplexed signals and, optionally, routing each signal to the necessary destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional, perhaps non-POTS, information sets to be sent and received through interface 236 simultaneously with the POTS information. This can include, for example, aggregating information sets for transmission of an HPNA signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, memory devices, including both volatile and nonvolatile memories, and storage devices, including hard disk drives, optical drives and other media. In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and FreeBSD™ operating systems.

Telecommunication information or content objects can be processed by processing system 244 in a variety of ways, including, for example, routing a given content object to a particular interface, transforming information such as by encoding and/or decoding information and converting between different transport protocols, storing information, filtering information, and any of the other functions described herein with respect to processing systems. In certain embodiments, processing system 244 can serve as the termination point for an external transport medium; for instance, processing system 244 can incorporate the functionality of an xDSL modem. In other embodiments, processing system 244 can serve to identify quality-of-service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In the illustrated example, processing system 244 is in communication with aggregator 240, which, as discussed above, can aggregate non-POTS information sets received from processing system 244 and POTS information sets received directly from discrimination device 232 for consolidated transmission via interface 236. In effect, discrimination device 232 and aggregator 240, perhaps in conjunction with processing system 244, can function to separate telecommunication information received on interface 228 into a set of POTS telecommunication information and a set of non-POTS telecommunication information. POTS information can be understood to include ordinary telephone signals, and non-POTS information can be understood to include all other telecommunication information). The non-POTS information is routed via transport medium 248 to processing system 244 for processing, and the POTS information is routed to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse, i.e., to separate and recombine different sets of telecommunication information received on interface 236 from the customer's premises. Thus, in some embodiments, both discrimination device 232 and aggregator 240 each can perform a combined discrimination-device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244, and could route information sets among any of those three components as necessary. Moreover, as described below, the functionality of discrimination device 232 and/or aggregator 240 can be incorporated into processing system 244; likewise discrimination device 232 can incorporate interface 228 and/or aggregator 240 can incorporate interface 236, such that discrimination device 232 and/or aggregator 240 comprise the necessary components to be coupled directly to the external and internal transport media, respectively.

Discrimination device 232 and/or aggregator 240 can also serve another function in certain embodiments: Since the external transport medium is coupled to first interface 228 and the internal transport medium can be coupled to, inter alia, second interface 236, the discrimination device 232 and/or aggregator 240 can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system 244. In yet other embodiments, the isolation device might comprise a separate piece of hardware in communication with discrimination device 232, aggregator 240 and/or processing system 244.

NID 200 may also comprise one or more application devices 246, which are usually disposed in the network area 216. The application devices are generally provided in communication with the processing system 244 by transport media 251, 263, and/or 268. In some instances, such as illustrated with application devices 246A and 246B, the application devices may be in communication with interfaces 256 and 260 that allow communication with transport media internal to the customer premises, such as over transport media 264 and 269. For example, interface 256 could be a coaxial interface for connection to RG6 and/or RG59 cable, and interface 260 could be an RJ45 and/or RJ11 interface for connection to unshielded twisted pair cable, which can, for instance, form a 10Base-T Ethernet network.

In other instances, such as illustrated with application device 246C, information might be routed from the application device 246C through the aggregator. Such an application may be suitable for applications that use IP data, such as a VoIP application. For example, NID 200 might receive IP data, perhaps combined with other types of telecommunication information, on interface 228. The information set comprising the IP data can be routed by the discrimination device 232 via medium 248 to processing system 244, where it can be processed. Depending on the embodiment, it could then be routed via transport medium 251 to VoIP application device 246C and then provided to the customer's existing telephone wiring using interface 236, optionally in conjunction with aggregator 240 and/or one or more line drivers. It could alternatively be routed to any of the other application devices 246A or 246B depending on their functionality. In this way, the NID can allow virtually unlimited connectivity options for each CPE at the customer premises. Adding to the flexibility of NID 200, the processing system 244 could include components to serve, for example, as a cable or xDSL modem, as well as components to serve as an Ethernet hub, switch, router, or gateway, the functions of each of which are familiar to those of skill in the art.

Furthermore, the application devices 246 may be provided generally within the network area 216 or in the consumer area 208, or with some in the network area 216 and others in the consumer area 208, depending on the embodiment. This is illustrated in FIG. 5A by showing application devices 246A and 246C disposed within the network area 216 of NID 200 and application device 246B disposed within the consumer area 208 of NID 200.

There are a variety of different application devices 246 that can be incorporated within NID 200 in order to provide a versatile range of functionality. The following examples are provided merely by way of illustration and still other application devices that may additionally or alternatively be used will be evident to those of skill in the art after reading this description. One application device 246 that may be included is a digital-recorder application device, which could provide a mechanism for digital recording of all forms of information incoming to NID 200 and make them accessible to a user at the customer premises. The information that could be recorded includes video, data, voice, among other types of information. Another application device 246 that may be included is a digital storage application device, which could provide a supplementary mechanism for storing information presented to user applications. The information that could be stored also includes video, data, voice, and other types of information. The combination of the digital-recorder application device and digital-storage application device in an NID 200 may be used conveniently to provide primary and secondary information-storage capabilities. For example, the digital-recorder application could be used to provide a primary, on-line, video storage capability while the digital-storage application could be used to provide a secondary, off-line, video storage capability. Still other application devices could be included to enhance such functionality further. For example, hard-drive application device could be provided to permit expandable storage capabilities.

Other examples of application devices 246 whose functions may be conveniently coordinated include digital-asset application devices. For example, one of application devices 246 in NID 200 could comprise a digital-asset sharing application device to permit sharing of information among equipment within the customer premises. Such an asset-sharing capability may be used within the customer premises to share video, data, electronic books, games, music, and the like. Another of application devices 246 could comprise a digital-asset caching application device to permit storage and distribution of digital assets. The combination of digital-asset sharing application devices and digital-asset caching application devices among a plurality of NIDs 200 in a service are could then be used to permit exchange of video, data, electronic books, games, music, and the like among customer premises throughout a defined service area. In some instances, a further application device 246 could comprise a digital-asset protection application device to control the distribution of digital assets in accordance with legal restrictions, such as those derived from copyright ownership.

In some embodiments, the application devices 246 may comprise application devices for effecting various voice-related applications within a customer premises. For example, a voice application device could include functionality to provide such functions as telephone caller identification, call logs, voice mail-storage, voice-mail retrieval, call waiting, solicitation barriers, and the like. In addition, a VoIP application device could provide support for VoIP functions within the customer premises.

Still other application devices 246 that may be used include various types of informational applications. For example, an online digital guide application device could be used to provide a digital data guide for television, music, and other types of programming. Such a data guide could be provided alternatively in real time or in non-real-time. A further example of an informational application could be realized with a home-utilities application device adapted to provide monitoring and/or billing tracking functions for utilities used within the customer premises. In this way, the use and/or cost of electricity, gas, water, and other utilities may be monitored by the customer. In addition, a diagnostic-interface application device may be provided to permit diagnostic functions of equipment within the customer premises, thereby permitting the customer to obtain information on the functioning of such equipment.

Other application devices 246 may provide security functions. For example, a data security application device may be used to provide hacker protection for the home, responding to identified attempts to breach the security of the customer premises. In addition, a home-security application device could be provided to monitor the physical security of the customer premises. Such a home-security application device would typically be provided with an interface to door and window monitors to determine whether they are open or shut, and with an interface to motion detectors, glass-breaking detectors, and other physical security equipment known to those of skill in the art.

Application devices 246 may also be provided to permit various types of data-conversion functions to be used by the customer premises. For example, a digital-information-conversion application device may be provided to convert digital information incoming to NID 200 to be converted to other sources for use by CPE in the customer premises. Thus, incoming digital information could be converted to analog information for use by analog equipment, such as an analog television. Similarly, incoming broadcast video could be converted for transmission to a PDA, and the like. Similarly, a wireless application device could be used to provide a wireless interface to the customer premises for data, video, and other types of information. Merely by way of example, if interface 228 receives telecommunication information that includes digitally encoded video signals, such as MPEG-2 data, the information set that includes the encoded video signals can be routed by discrimination device 232 to processing system 244. After transmission from the processing system to the information-conversion application device over transport medium 263, the signals can be decoded into RF-modulated NTSC, HDTV, PAL and/or SECAM format for transmission via transport medium 264 to coaxial interface 256, where it can be transmitted via coaxial cable to one or more televisions at the customer premises. Alternatively, if the customer has a digital set-top box located at the television, the encoded signals can be routed by to aggregator 240, where the signals can be transferred through interface 236 to the set-top box for decoding. The ability of NID 200 to support multiple interfaces of different types thus allows great flexibility in routing telecommunication information throughout the customer premises.

Each of the application devices 246 in the NID may include a service interface 277 to permit states of the application devices 246 to be changed and/or updated. As previously notes, such interfaces may comprise physical interfaces such as USB, FireWire (IEEE 1394), RJ-11, RJ-45, serial, coaxial, or other physical interfaces, to permit a service technician to interact with the application devices 246 while at the site of NID 200. Alternatively, the service interfaces may comprise logical interfaces to permit IP addressing to be used in changing the state of the application devices. In many instances, NID 200 may also include a future-application device with open architecture to support new applications. The architecture may be configured by use of the service interfaces 277 when the new application is implemented.

In certain embodiments, NID 200 can comprise a line driver (not shown on FIG. 5A or 5B), coupled to processing system 244 and aggregator 240. The line driver can function to allow conversion between various network formats and media, allowing a variety of different media types, e.g., twisted pair and/or coaxial cable, in accordance with the HPNA and HPNA+ standards, as well, perhaps, as the customer premises' A/C wiring, in accordance, for example, with the HomePlug™ standard, to transport combined POTS and non-POTS information sets.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface, such as interface 256, or through a dedicated transformer plugged into an AC outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

Figure 5C:
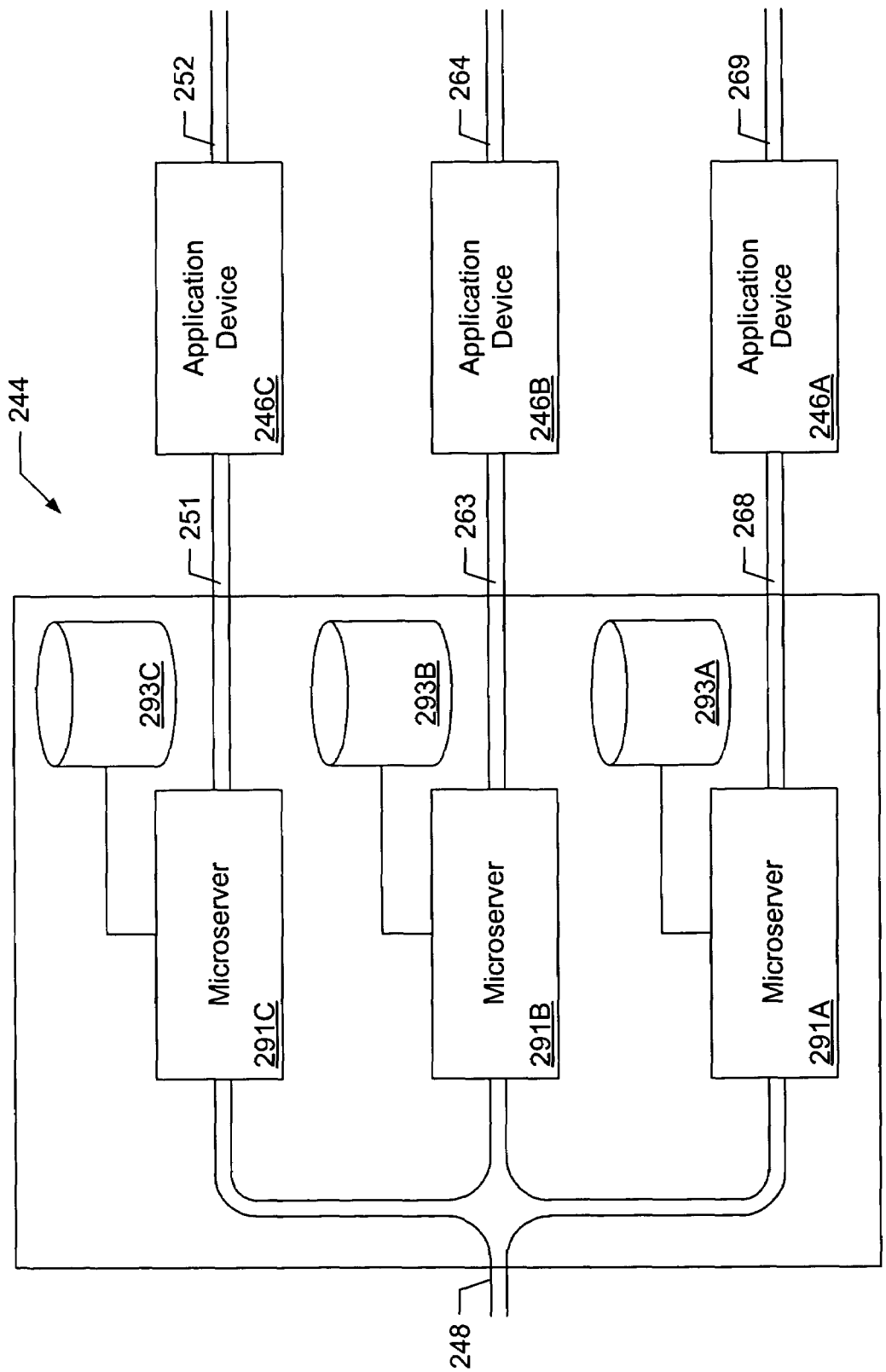

As mentioned above, processing system 244 can comprise a plurality of processing devices, and each processing device can comprise multiple components, including microservers, memory devices, storage devices and the like. As used herein, a "microserver" is intended to refer to any device programmed to perform a specified limited set of functions, such as an EPROM. Merely by way of example, FIG. 5C provides a detailed illustration of an exemplary processing system 244, which comprises multiple processing devices 291. In accordance with the exemplified embodiment, transport medium 248 links processing system 244 with an external transport medium, perhaps via a discrimination device and/or interface, as described above.

Transport medium 248 can be coupled to a plurality of microservers 291 such that any information received by the processing system 244 via transport medium 248 may be routed to any of the microservers 291. Each microserver can, in some embodiments, be the equivalent of a server computer, complete with memory devices, storage devices, and the like, each of which is known in the art. In FIG. 5C, storage devices 293 associated with each of the microservers 291 are shown. Each of the microservers may be associated with one of the application devices 246 to provide information received from transport medium 248 and specifically processed for use by the corresponding device. Thus, the microservers 291 may individually be adapted to function as, for example, HTML microservers, authentication microservers, FTP microservers, TFTP microservers, DHCP microservers, WebServer microservers, email microservers, critical alert microservers, home-security microservers, VPN microservers, advertising microservers, instant-messaging microservers, wireless microservers, RF microservers, test-access microservers, data-security microservers, and the like.

In addition to these functions, microservers 291 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microservers 291 can serve switching functions somewhat similar to that described with respect to discrimination device 232 described in relation to FIG. 5A. For instance, if IP data is received by microserver 291A, such data can be routed to an Ethernet connection, to the existing telephone wiring, e.g., in an HPNA implementation, or to any other appropriate medium, perhaps via an appropriate line driver. In fact, in certain embodiments, processing system 244, and in particular one or more of microservers 291, can incorporate the functionality of discrimination device 232 and/or aggregator 240, rendering those components optional. In some embodiments, one or more of the microservers may be adapted to function as a controller for NID 200, overseeing the NID's state and monitoring performance. In some embodiments, the controller functions can be accessed using a web browser.

Processing system 244 can have multiple means of input and output. Merely by way of example, microservers 296 can communicate with one or more external transport media (perhaps, as discussed above, via intermediary devices) using one or more transport media (e.g., 248). Processing system 244 also can communicate with one or more internal transport media via a variety of information conduits, such as category 5, 5e and/or 6 unshielded twisted pair wire 268, RG6 and/or RG59 coaxial cable 264, and category 3 unshielded twisted pair copper (telephone) wire 252, again possibly via intermediary devices, as discussed with reference to FIG. 5A. Notably, some embodiments of processing system 244 can include interfaces for multiple transport media of a particular type, for instance, if processing system 244 serves as a networking hub, switch or router. Processing system 244 can also have infra-red and radio-frequency receivers and transmitters, for instance to allow use of a remote control device, as well as wireless transceivers, for instance to allow wireless (e.g., IEEE 802.11) networking.

FIG. 5D illustrates one example of processing system 244 of NID 200 in accordance with some embodiments of the present invention where one of microservers 291 is associated with a content object access control device 254. Content object access control device 254 can be any hardware and/or software module that can provide access to content objects maintained on a content object storage 253, or via some other content object device (not shown). In some cases, content object storage is the same as local storage 1132 as previously described. Similarly, in some cases, content object access control device 254 can include hardware and/or software to perform the functions described in relation to local control 1131 above, and to implement the various other content object access routines described herein. Content object storage 253 can be any type of storage device capable of maintaining and/or accessing content objects. Thus, for example, content object storage 253 can be a hard disk drive, a CD-ROM drive, a DVD drive, a personal computer, and/or the like. In some cases, at least a portion of content object storage is installed in NID 200 with other portions installed external to NID 200. In other embodiments, all of content object storage 253 is installed in NID 200, while in yet other embodiments, none of content object storage 253 is installed in NID 200. Based on the disclosure provided herein, one of ordinary skill in the art will understand various methods can be used to communicably couple content object storage 253 with NID 200, and to provide access control to/from content object storage 253 via content object access control device 254.

By incorporating content object storage 253 with NID 200, access to content objects and serving content objects can be provided via the customer premises. This can include access to the content objects by a user at the customer premises, or by others external to the customer premises that are communicably coupled to the customer premises. Thus, for example, a live camera may be placed in communication with content object access control device 254. In this way, video information from the camera can be accessed by other users via the NID, or by users at the customer premises via the same NID. Alternatively, or in addition, a variety of content objects can be maintained on content object storage 253, and also served to other users and/or utilized by users at the customer premises. Content object storage 253 can store content objects that are produced at the customer premise, or that are downloaded from some content object origination.

In some embodiments, a separate interface is provided for storing content objects to one or more offline media. As used herein, offline media is any media that must be installed in an online device to be accessed. Thus, for example, offline media can include, but is not limited to, CD-ROMs, DVDs, Flash Cards, floppy disks, tape disks, and/or external drives. In some cases, content objects maintained on content object storage 253 is written on a track-by-track and sector-by-sector basis. In some cases, the information maintained on content object storage 253 is in encrypted format, and is decrypted by an application operating on the NID. In other cases, the information is received in encrypted format and is decrypted by the NID prior to storage on content object storage 253.

In particular embodiments, a section of content object storage 253 is apportioned to accept firmware updates and/or other updates. In such cases, such updates can be written to the portion of content object storage 253 installed as part of the NID. It should be noted that such an approach provides for scalability where multiple hard drives, or other storage elements can be added to existing storage elements forming content object storage 253.

Figure 6:
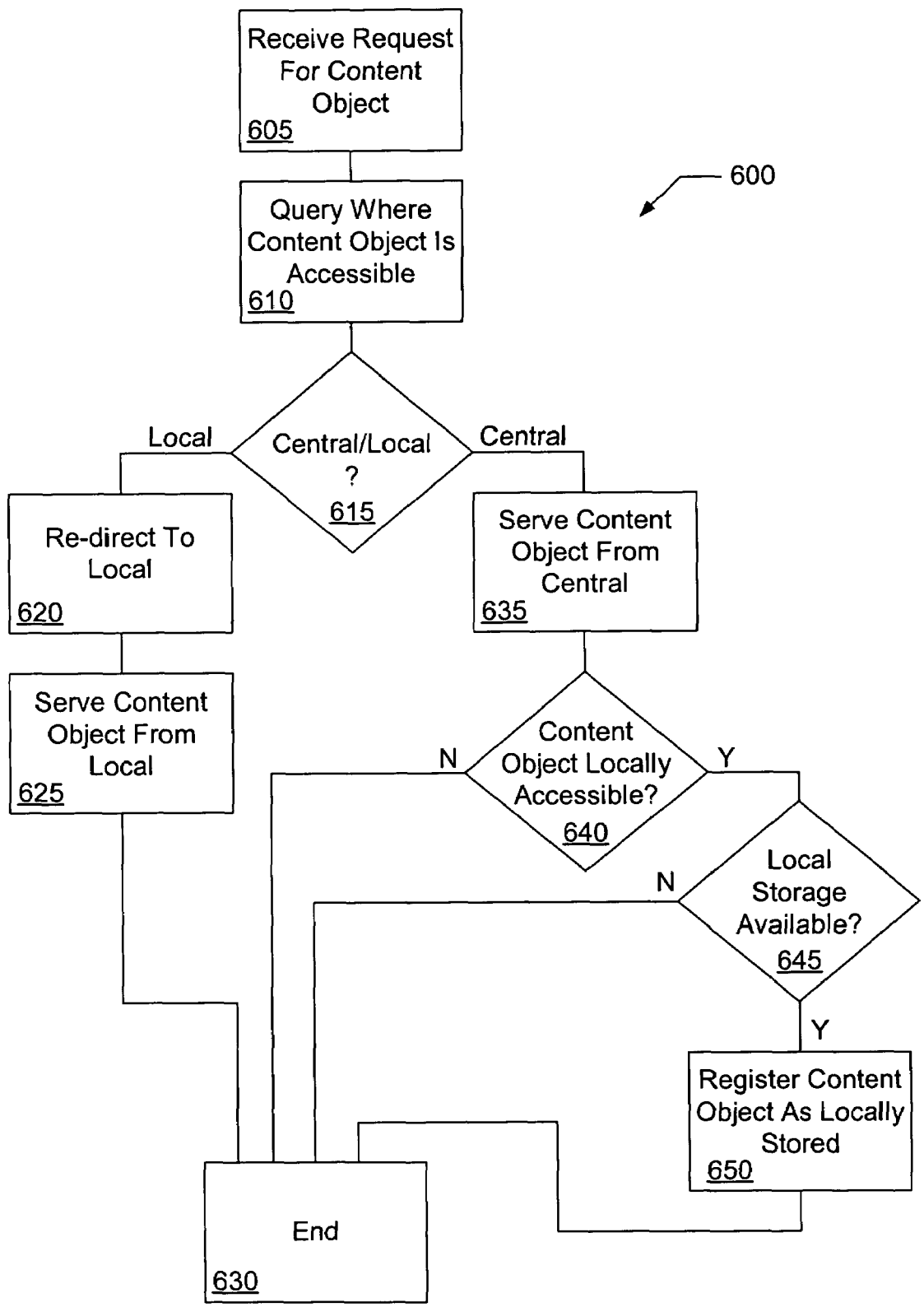
FIGS. 6-9 illustrate various methods in accordance with embodiments of the present invention.

Turning to FIG. 6, a flow diagram 600 illustrates one method in accordance with embodiments of the present invention. Following flow diagram 600, a request for a content object is received at a content object origination (block 605), and a query is issued to determine where the requested content object is located (block 610). This can include querying global control 1125 that maintains a location listing for content objects. Where the requested content object is available locally from a content object destination associated with the network (block 615), the request is redirected to the identified content object destination (block 620), the content object is served from the content object destination (block 625), and the process completes (block 630).

Alternatively, where the content object is not available from a content object destination (block 615), the content object is served from the content object origination (block 635). It is determined if the content object is to be maintained on a the requesting content object destination (block 640). Where it is not, the process completes (block 630). Alternatively, where it is to be maintained (block 640), it is determined if local storage is associated with the content object destination (block 645). Where storage is available (block 645), the content object is written to the storage (block 650). This may include overwriting another content object maintained on the storage. The overwrite can be performed in accordance with content object retention rules maintained in relation to content destination. Such retention rules can include, but are not limited to, a first in-first out policy, a last used policy, or the like.

Figure 7:
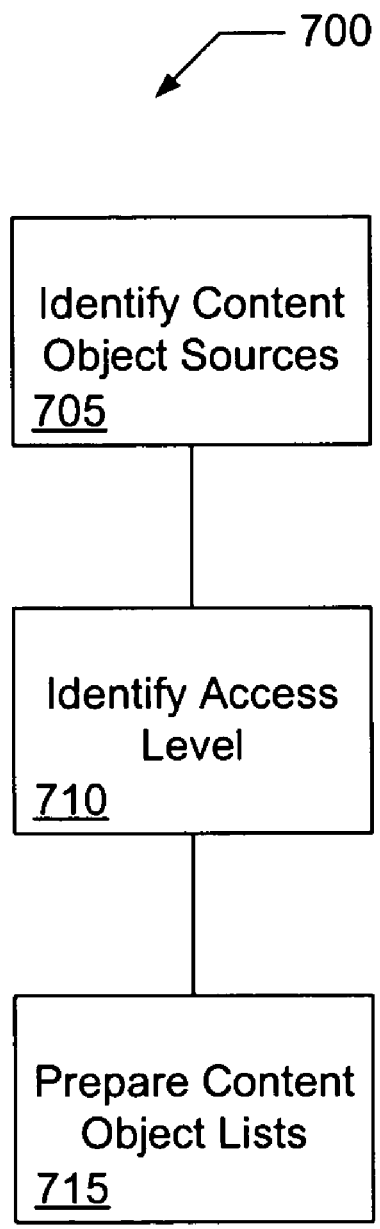

Turning to FIG. 7, another method in accordance with other embodiments of the present invention is described as flow diagram 700. Following flow diagram 700, an access control, such as global control 1125 or access control 1220 identifies various content object sources such as accessible device 1250, 1260, content storage 1132, and/or global storage 1127 (block 705). From this, a list of available content objects is assembled. This list of content objects can be further filtered based on accessibility rules as previously discussed (block 710), and filtered lists of content objects then assembled (block 715).

Figure 8:
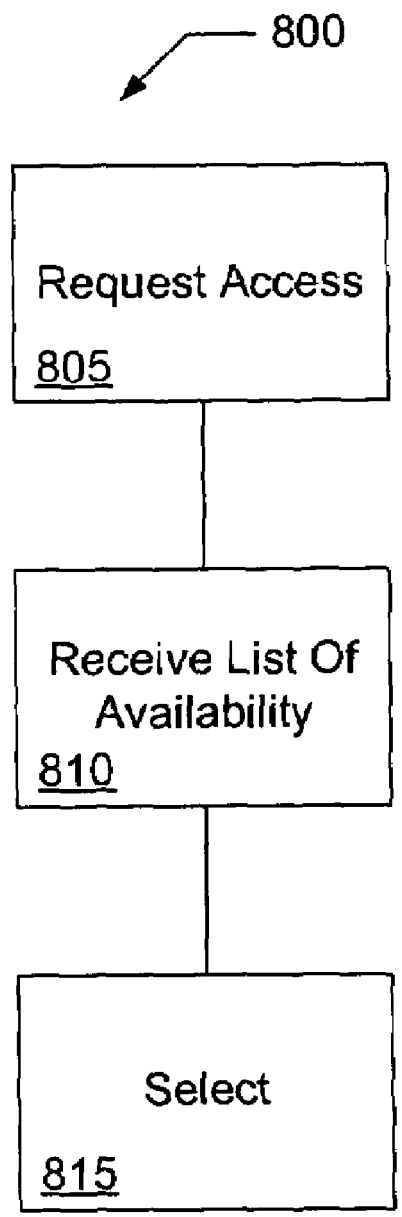

Turning to FIG. 8, a flow diagram 800 illustrates another process in accordance with embodiments of the present invention. Following flow diagram 800, a request for a list of content objects is received (block 805). The user and/or device providing the request is identified and/or authenticated, and a list of content objects available to the user and/or device is provided (block 810). Then, the user can select one or more of the content objects to be served (block 815).

Figure 9:
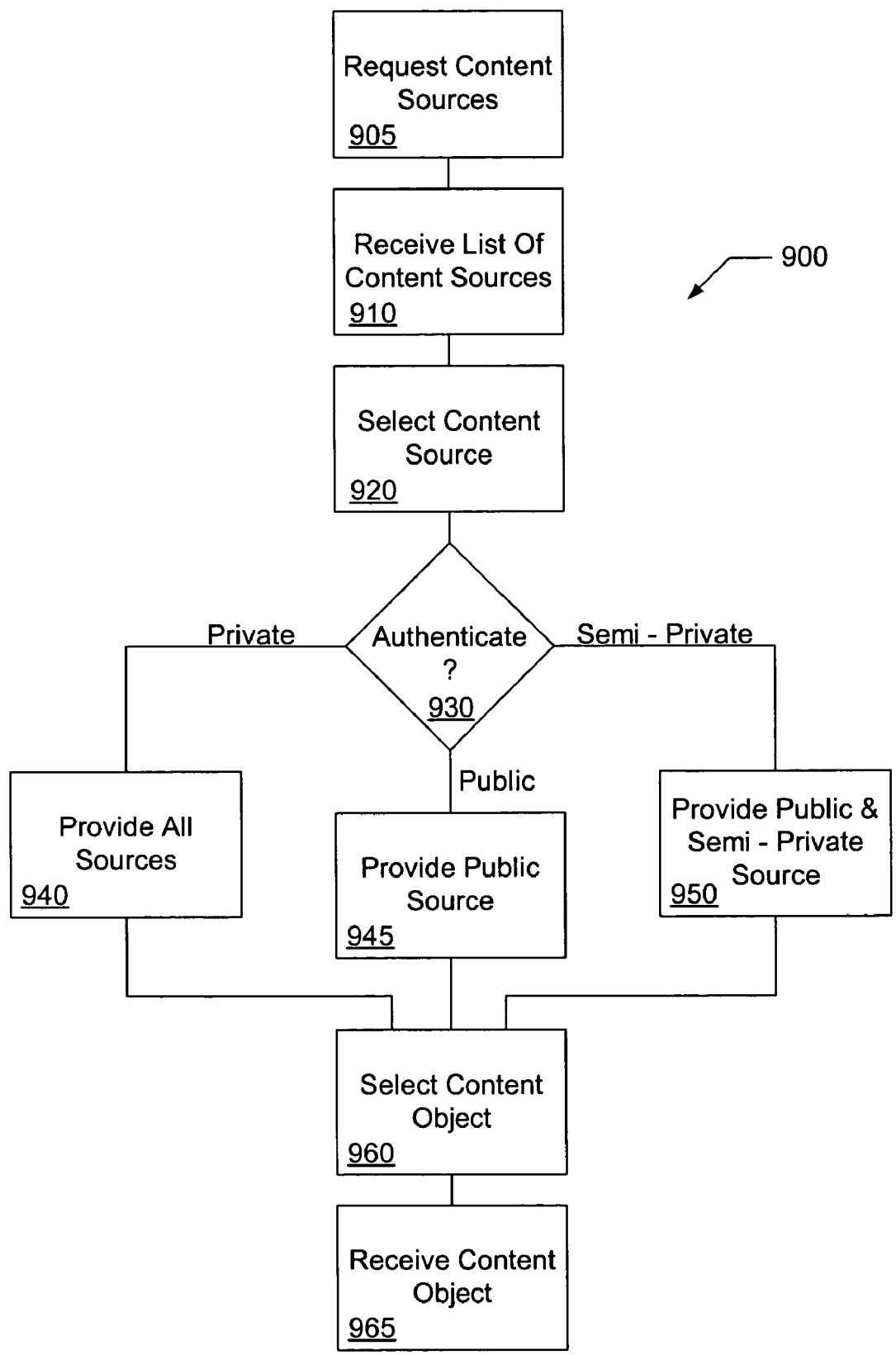

Turning to FIG. 9, a flow diagram 900 illustrates yet another process in accordance with embodiments of the present invention. Following flow diagram 900, a user requests a list of content object destinations and/or originations (block 905). From the list, the user selects a content object destination or origination (block 920), and authenticates to the selected content object destination (block 925). A list of content objects available to the user are then provided based on the authentication. For example, where the user is only minimally identified, only public access is available (block 930). In such a case, a list of available public content objects is displayed (block 945). Alternatively, where the user is authenticated as being part of a known group, a list of both public and semi-private content objects may be displayed (block 950). As yet another alternative, where the user is authenticated as a privileged user, a list of all content objects is presented (block 940). Based on the disclosure provided herein, one of ordinary skill in the art will appreciate a number of different types of authentications ranging from complete access to very limited access. From the presented list, the user can select a content object (block 960) that is in turn provided to the user (block 965).

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for distributing content objects, the system comprising:
   a content object origination;
   a first content object destination, wherein the first content object destination is located at a first customer premises of a first end user of the content objects;
   a second content object destination, wherein the second content object destination is located at a second customer premises of a second end user of the content objects;
   a first communication link, wherein the first communication link communicably couples the content object origination with the first content object destination;
   a second communication link, wherein the second communication link communicably couples the first content object destination with the second content object destination wherein the first communication link and the second communication link include a common physical layer portion, wherein the first communication link operates at a first spectrum on the common layer portion, and wherein the second communication link operates at a second spectrum on the common physical layer portion;

a local storage located at the first content object destination, wherein a content object from the content object origination is maintained on the local storage, and wherein the content object maintained on the local storage is accessible to the second content object destination.

2. The system of claim 1, wherein the second communication link is a subset of the first communication link.

3. The system of claim 1, wherein the content object origination is a device operated at the first customer premises.

4. The system of claim 1, wherein the content object origination is selected from a group consisting of a central office server, a remote terminal, and a content object production center.

5. The system of claim 1, wherein the content object origination is a central office server that is maintained by a telecommunication service provider.

6. The system of claim 1, wherein the content object origination is a central office server that is maintained by a cable television provider.

7. The system of claim 1, wherein the content object is selected from a group consisting of: a digital video object, a digital audio object, a digital still picture object, and a digital data object.

8. The system of claim 7, wherein the digital video object is selected from a group consisting of a live video object and a pre-recorded video object.

9. The system of claim 1, wherein the system further comprises:
a first network interface device, wherein the first network interface device is physically coupled to a physical layer of the first communication link; and
a second network interface device, wherein the second network interface device is physically coupled to a physical layer of the second communication link.

10. The system of claim 9, wherein the physical layer of the first communication link is physically coupled to the physical layer of the second communication link.

11. The system of claim 9, wherein the first communication link is a physical layer extending through the first customer premises.

12. The system of claim 9, wherein the first communication link includes a physical layer communicably coupling the first network interface device to a central office server.

13. The system of claim 12, wherein the second communication link includes a physical layer communicably coupling the second network interface device to the central office server.

14. The system of claim 1, wherein the system further includes a network interface device installed at the first customer premises, and wherein the local storage is physically coupled to the network interface device.

15. The system of claim 1, wherein the system further includes a network interface device installed at the first customer premises, wherein the network interface device comprises a converter that is operable to convert information in a first format to information in a second format.

16. The system of claim 15, wherein the information in the first format is accessed via the first communication link, and wherein information in the second format is provided via the second communication link.

17. The system of claim 15 wherein the first format is selected from a group consisting of: MPEG2, MPEG4, text, digital audio, program data, Bitmap, JPEG, GIF, HTML, dynamic HTML, cascading style sheets, MP3 audio, MPEG 1 layer one and three audio, digital video, and XML.

18. The system of claim 17, wherein the second format is selected from a group consisting of: MPEG2, MPEG4, text, digital audio, program data, Bitmap, JPEG, GIF, HTML, and XML.

19. A method for distributing content objects, the method comprising:
receiving a first request for a content object;
distributing the content object to a first customer premises of a first end user of the content object based at least in part on the first request, wherein the content object is maintained on a local storage located at the first customer premises;
marking the content object as accessible from the local storage;
receiving a second request for the content object; and
redirecting the second content request to the local storage, wherein the second content request is at least partially satisfied from the local storage by distributing the content object from the local storage to a second customer premises of a second end user of the content object based at least in part on the second content request wherein the first request for the content object is received at a central office, wherein the central office is communicably coupled to the first customer premises by a first communication link, and wherein the second communication premises is communicably coupled to the second customer premises by a second communication link, wherein the first communication link and the second communication link includes a common physical layer portion, wherein the first communication link operates at a first spectrum on the common physical layer portion, and wherein the second communication link operates at a second spectrum on the common physical layer portion.

20. The method of claim 19, wherein the local storage is associated with a network interface device installed at the first customer premises.

21. The method of claim 19, wherein the first request for the content object is received at the first customer premises.

22. The system of claim 19, wherein the content object is originated from a central office server.

23. The method of claim 19, the method further comprising:
providing a first network interface device at the first customer premises; and
providing a second network interface device at the second customer premises;
wherein distribution of the content object from the first customer premises to the second customer premises is performed via the first network interface device and the second network interface device.

24. The method of claim 19, the method further comprising:
converting the content object from a first format to a second format prior to distributing the content object to the second customer premises.

25. The method of claim 24, wherein the first format is selected from a group consisting of: MPEG2, MPEG4, text, digital audio, program data, Bitmap, JPEG, GIF, HTML, and XML.

26. The method of claim 25, wherein the second format is selected from a group consisting of: MPEG2, MPEG4, text, digital audio, program data, Bitmap, JPEG, GIF, HTML, and XML.

27. The method of claim 19, wherein portions of the second content requests are satisfied by a plurality of local storages associated with a plurality of customer premises.

28. The method of claim 19, wherein the method further comprises:
    building a query database that identifies content objects, content object originations, and content object destinations.

* * * * *